United States Patent [19]

Schleiter, Sr.

[11] Patent Number: 4,556,083
[45] Date of Patent: Dec. 3, 1985

[54] PRESSURE RELIEF VALVE AND METHOD FOR MODIFICATION THEREOF

[75] Inventor: Daniel P. Schleiter, Sr., Mt. Prospect, Ill.

[73] Assignee: Vapor Corporation, Chicago, Ill.

[21] Appl. No.: 569,792

[22] Filed: Jan. 12, 1984

[51] Int. Cl.<sup>4</sup> .................. F16K 15/03; F16K 21/04
[52] U.S. Cl. .................. 137/514; 137/515.7; 137/527; 251/303
[58] Field of Search .............. 137/514, 515.7, 527; 251/174, 176, 177, 303

[56] References Cited

U.S. PATENT DOCUMENTS

| | | | |
|---|---|---|---|
| 2,504,006 | 4/1950 | Davis | 137/514 |
| 2,578,590 | 12/1951 | Perrault | 137/514 |
| 2,717,001 | 9/1955 | Perrault | 137/514 |
| 2,925,825 | 2/1960 | Steiger | 137/514 |
| 3,106,220 | 10/1963 | Hose | 137/514 |
| 3,191,619 | 6/1965 | Allen | 137/514 |
| 3,395,727 | 8/1968 | Weise et al. | 137/515.7 |
| 3,857,408 | 12/1974 | Rhodes et al. | 137/514 |
| 3,942,551 | 3/1976 | Schuller et al. | 137/514 |
| 4,061,535 | 12/1977 | Nolan et al. | 137/514 |
| 4,188,973 | 2/1980 | Weise et al. | 137/514 |

*Primary Examiner*—Alan Cohan
*Attorney, Agent, or Firm*—Francis J. Lidd

[57] ABSTRACT

A pressure relief valve operable in large transient pressure conditions includes a valve body. A valve seat is movably mounted on the body. A valve disc or pallet is pivotally connected to the valve body by a valve arm and aligned to engage the valve seat in a valve closed position. The valve disc is secured to the valve arm by fasteners and shock absorbers are mounted between the arm and the valve disc. A resilient shock absorber is mounted between the valve seat and the valve body to absorb shock resulting from engagement of the valve disc with the valve seat. Absorption of shock resulting from opening of the valve is accomplished by a shock absorber including a lever mounted on the valve body. At least one shock absorber is mounted on the lever aligned to be engaged by the valve disc upon opening. A second shock absorber may be included to engage the side of the conduit or housing within which the valve is mounted. An existing pressure relief valve including a rigid valve seat and a pivotally mounted valve disc may be modified to operate in large transient pressure conditions. The rigid seat is replaced by a sliding seat biased by a shock absorber and a shock absorber is pivotally mounted on the valve by an arm adjacent the valve disc.

3 Claims, 3 Drawing Figures

PRESSURE RELIEF VALVE AND METHOD FOR MODIFICATION THEREOF

BACKGROUND OF THE INVENTION

A. Field of the Invention

The present invention relates to a new and improved valve for relieving pressure or vacuum within a vessel or conduit, and to a new and improved method for modifying a low pressure relief valve to relieve vacuum within a vessel within which substantial transient pressure conditions may exist.

B. Description of the Background Art

Large volume vessels typically include a pressure or vacuum relief valve to relieve pressure or vacuum that develops within the vessel thereby avoiding an unsafe condition. Typical valves employed in such vessels are disclosed in U.S. Pat. Nos. 2,971,531 and 4,091,837. The valves disclosed in these patents utilize a pallet type closure member or valve disc in low pressure relief services that subject the valve in the closed or non-vent position to maximum pressures in the order of 15 psi. U.S. Pat. No. 4,253,489, hereby incorporated by reference, also discloses a low pressure pallet type releif valve, however utilizing a magnetic latch to provide consistent pallet retention forces, and accordingly accurate relief settings.

Such low pressure relief valves have been used primarily to relieve vacuum in large pressure vessels such as petroleum storage tanks in which, due to the large volumes of the product to be vented, have rates of change of pressure which are exceedingly low. Since these relief valves were designed for applications with slow or low rates of change of pressure, the valves have not been suitable in applications experiencing rapid fluctuations from vacuum or negative relief pressure to relatively high positive operating pressure. For example, applications have arisen in large steam generating facilities requiring vacuum relief in vessels experiencing rapid changes in product pressure over the entire valve operating range. The valves of the type disclosed in the above-identified patents have been used in these rapid pressure fluctuating environments and have experienced short valve lives and are often damaged due to the rapid movement of the valve disc or pallet from full closed to full open positions. One solution has been to employ a massive pallet or valve disc to absorb the kinetic energy contained in the valve disc, but this method has proven unsuccessful in part due to the requirement for fast valve relief in most operations.

SUMMARY OF THE INVENTION

An object of the present invention is to provide a new and improved pressure relief valve.

Another object of the present invention is to provide a new and improved pressure/vacuum relief valve operable in large transient pressure environments.

A further object of the present invention is to provide a new and improved pressure/vacuum relief valve including a valve seat capable of absorbing substantial shock occurring from seat engagement of a valve disc with the valve seat.

Still another object of the present invention is to provide a new and improved pressure/vacuum relief valve including a shock absorber for absorbing the energy of a valve disc upon opening and preventing engagement of the valve disc with the surrounding structure.

Another object is to provide the assembly and method for modifying an existing low pressure/vacuum relief valve to a valve operable in large transient pressure conditions.

The present invention is directed to a new and improved pressure/vacuum relief valve applied to conduit or vessel that experiences large transient pressure conditions. The valve includes a valve body with a movably mounted valve seat. A shock absorber is positioned between the valve seat and the valve body. A valve arm is pivotally mounted on the valve and is attached to a valve disc at a location such that in the valve closed position the disc engages the valve seat. The valve disc is secured to the valve arm by fasteners and shock absorbers are mounted between the disc and arm. Typically, a lever is pivotally mounted to the valve and extends adjacent to the valve arm although other similar mounting methods will suggest themselves to those skilled in the art. At least one shock absorbing member is mounted on the lever next to the valve arm in a position to engage the valve arm or disc. Another shock absorber is mounted on the side of the lever opposite the first shock absorber in a location to engage the surrounding structure upon pivoting of the lever during valve opening.

BRIEF DESCRIPTION OF THE DRAWINGS

The above and other objects and advantages and novel features of the present invention will become apparent from the following detailed description of a preferred embodiment of the invention illustrated in the accompanying drawings wherein.

DESCRIPTION OF THE PREFERRED EMBODIMENT

Figure 3:
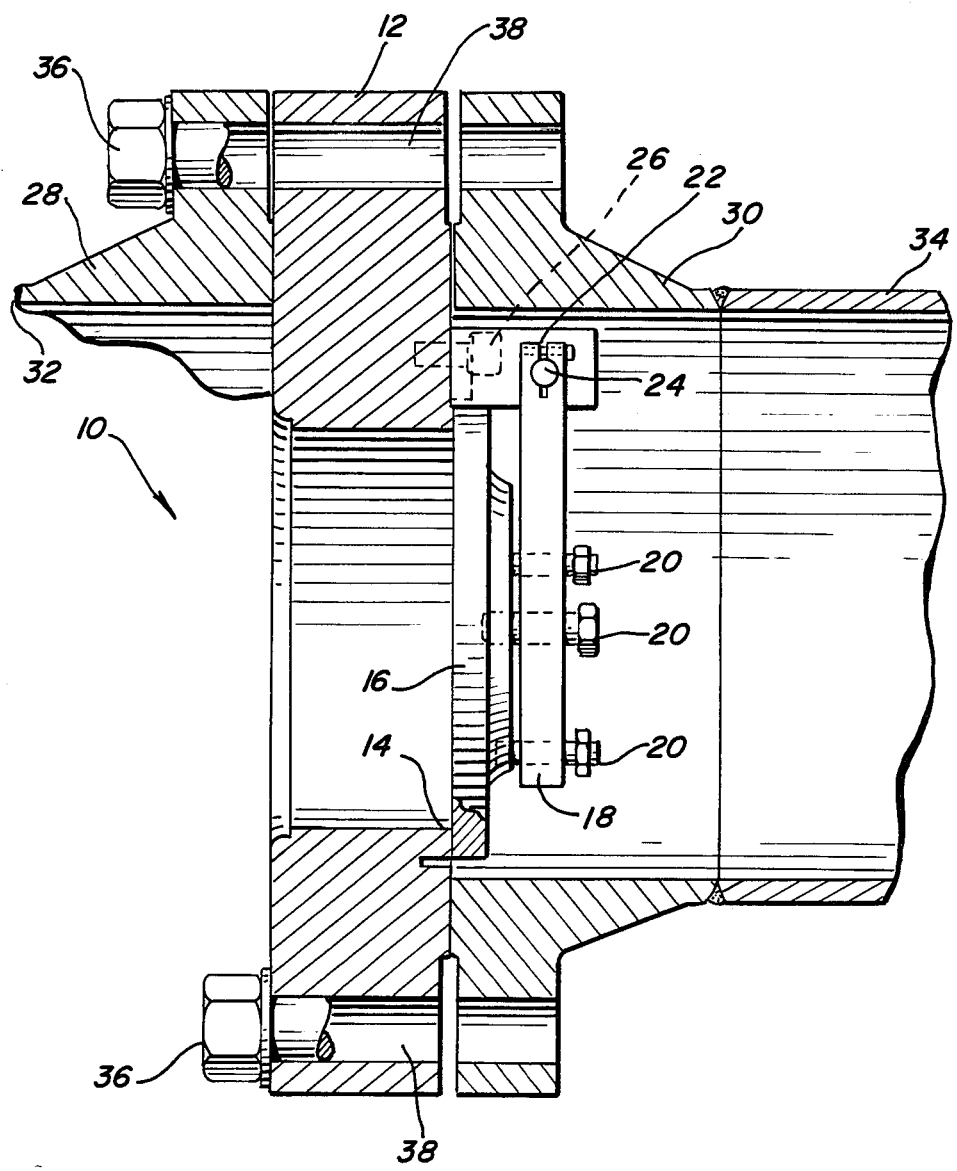
FIG. 3 is a vertical, cross sectional view of a low pressure relief valve.

Low pressure vacuum/relief valves used in steam containers and containment suppression pool discharge lines are not capable of operating without damage under large transient pressure conditions. Applicant submits that use of the word "pressure" denotes both positive and negative (vacuum) quantities, and "pressure changes" contemplate, inter alia pressure changes from positive to negative. A low pressure valve is illustrated in FIG. 3 and designated by the reference numeral 10. The valve 10 includes a valve body 12 with a rigid, integral valve seat 14. A valve pallet or closure member 16 is mounted on a lever arm 18 by fasteners 20. The valve lever arm 18 is pivotally mounted to a support 22 by a pin 24. The support 22 is secured to the valve body 12 by fasteners 26. The position of the pallet 16 on the lever arm 18 is adjustable to allow the pallet 16 to engage the valve seat 14 in the valve closed position. The valve 10 is positioned between first 28 and second 30 flanges of pipes or conduits 32 and 34, respectively. The valve 10 is secured to the flanges 28 and 30 by hex bolts 36 (partially illustrated for clarity) that pass through apertures 38 in the valve body 12.

The valve 10 is illustrated in the valve closed position. To relieve low pressure differentials in the conduits 32 and 34, the valve pallet 16 and valve arm 18 pivot outwardly in a counterclockwise direction to relieve the pressure differential. A set spring (not shown) is secured to the support 22 to resist the opening of the valve pallet 16 and to insure seating of the pallet 16 in the seat 14. If large pressure differentials are experienced in the conduits 32 and 34, the pallet 16 and the valve arm 18 open with sufficient force to cause the pallet 16 and arm 18 to engage the conduit 34. Upon closing in these conditions, the pallet 16 engages the valve seat 14 with substantial and potentially damaging force.

Figure 1:
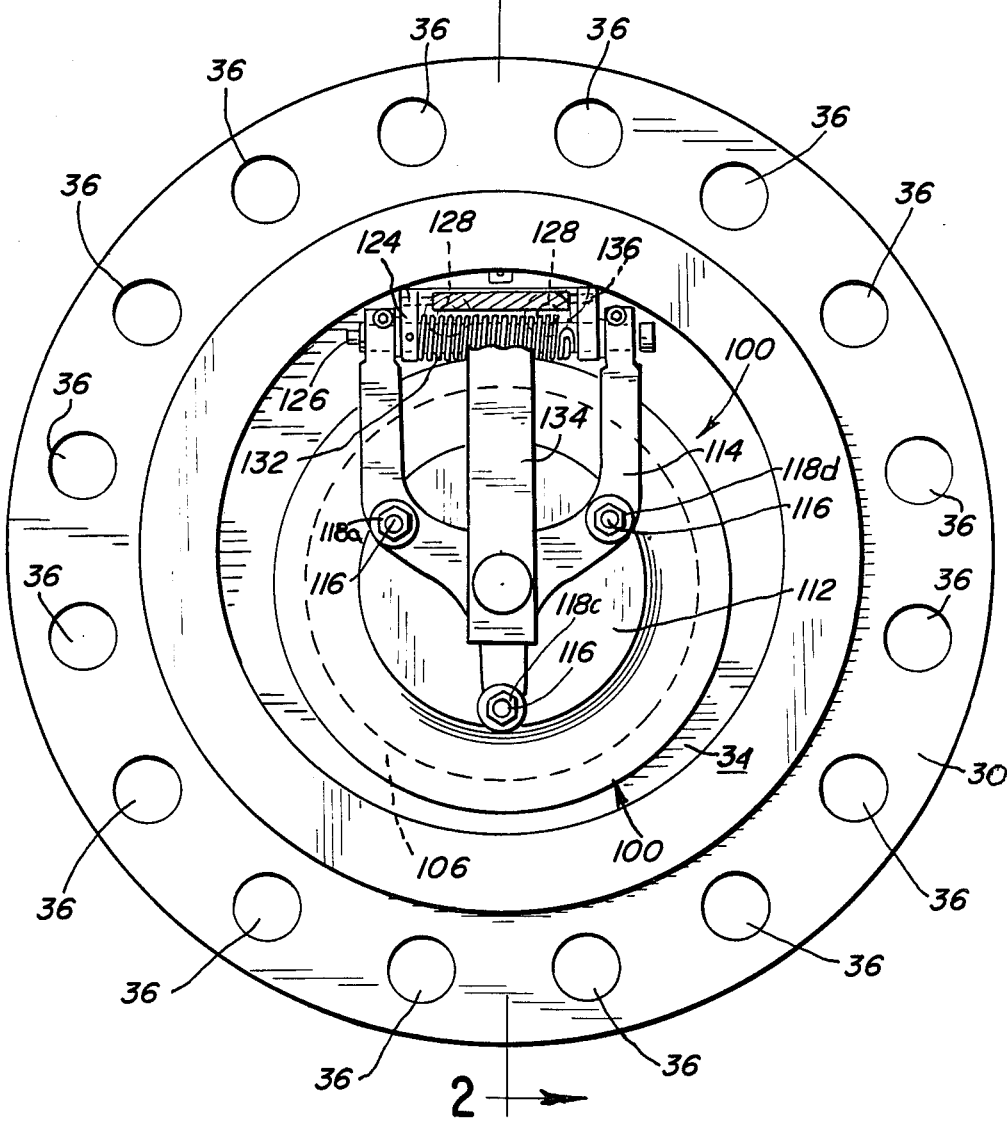
FIG. 1 is a partially cut-away, top plan view of a valve constructed in accordance with the principles of the present invention.
Figure 2:
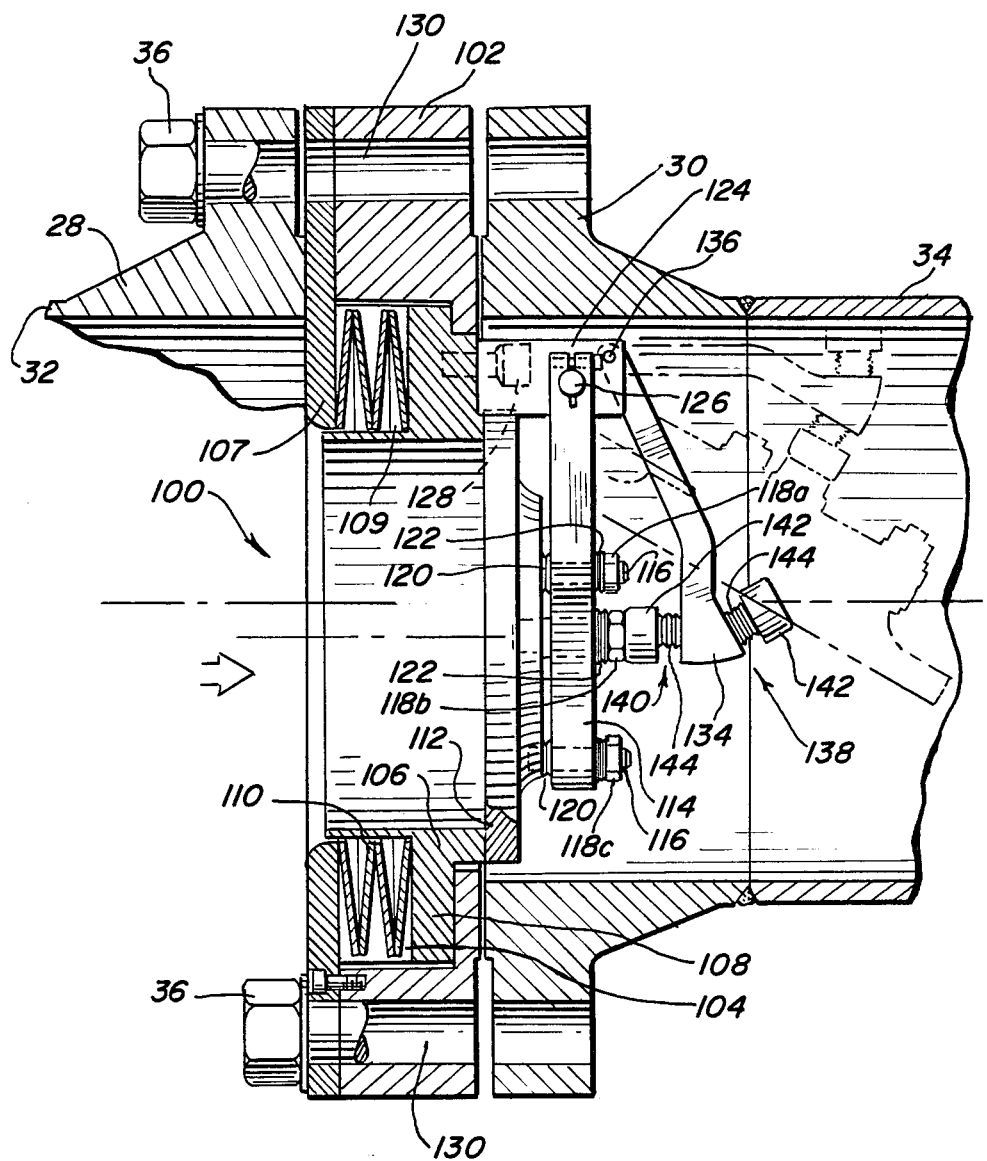
FIG. 2 is a vertical, cross sectional view taken generally along line 2—2 of FIG. 1.

It is desirable either to replace the valve 10 with one resistant to substantial transient pressure differentials or to modify the valve 10 to avoid damage to the valve. A pressure relief valve adapted for large pressure differential conditions is illustrated in FIGS. 1 and 2 and generally designated by the reference numeral 100. The relief valve 100 includes an annular valve body 102 with an annular groove 104. An annular valve seat 106 with an extending flange 108 is positioned within the groove 104. The flange 108 is of a smaller axial dimension than the groove 104 allowing the flange 108 to slide axially within the groove 104. Beneath the flange 108 is a chamber 109 defined at the bottom by an annular wafer 107. One or more springs or similar shock absorbing members 11 are positioned within the chamber 109 to serve as a shock absorber to control the rate of movement of the seat 106 upon being engaged.

Seat 106 is engaged by a valve pallet or disc 112 secured to a valve lever arm 114 by fasteners 116 and hex nuts 118a, 118b, 118c, and 118d. Compressible resilient discs 120 are positioned between the lever arm 114 and the valve pallet or disc 112 and compressible discs 122 are positioned between the hex nuts 118a, 118b, 118c, and 118d and the valve lever arm 114. The lever arm 114 is pivotally mounted to a support member 124 by a pivot or hinge pin 126. The support member 124 is secured to the valve seat 106 by fasteners 128. The valve 100 is positioned between the flanges 28 and 30 of the conduits 32 and 34 and rigidly secured by hex bolts 36 that pass through apertures 130 in the valve body 102.

A set point spring 132 is mounted about the pin 126 and is connected to the supports 124 and the lever arm 114 to apply a force on the lever arm 114 resisting opening. Typically a pressure differential of 0.2 psi or greater across the pallet 112 is sufficient to overcome the tension of the set point spring 132 and open the valve 100. Upon the occurrence of pressure transients substantially greater than 0.2 psi and particularly those pressure transients that are alternating in magnitude and direction, the forces acting on the valve pallet 112 result in large, high speed pivotal movement of the valve pallet 112. To avoid damage to the valve pallet 112 by engagement with the conduit 34, a shock absorbing lever or member 134 is pivotally mounted by a pin 136 to the support 124. Lever 134 includes shock absorbing elements 138 and 140 mounted on opposite sides of the lever 134. The shock absorbing elements 138 and 140 may be of any particular type and the type illustrated includes an impact member 142 mounted on a spring 144. As the valve pallet or disc 112 opens, the hex nut 118b engages the shock absorbing member 140 and pivots the shock absorbing lever 134 counterclockwise until shock absorbing member 138 impacts the inner peripheral surface of the conduit 34 (phantom lines in FIG. 2). The kinetic energy of the swinging pallet is absorbed by the shock absorbing members 138 and 140 and the elements 120 and 122 substantially reducing the likelihood of damage to the valve pallet 112. As the valve pallet 112 closes, the kinetic energy of the valve pallet 112 is absorbed by the resilient springs or shock absorbing elements 110, 120, and 122 preventing damage to the valve pallet 112 and seat 106.

The valve 100 may be a replacement for the valve 10, or in the alternative, the valve 10 may be modified by a kit or similar assembly. Modification includes replacing the valve seat 14 with the valve seat 106 and the shock absorbing member or spring 110. The disc shock absorbing members 120 and 122 are positioned between the valve pallet 16 and the valve lever 18 and a shock absorbing lever 134 is pivotally secured to the support 22. The valve as modified is operable in environments experiencing substantial pressure fluctuations.

What is claimed is:

1. A pressure relief valve, comprising:
   an annular valve body,
   an annular valve seat slidingly and concentrically mounted in said valve body,
   at least on resilient shock absorbing member positioned between said valve body and said valve seat,
   a valve arm pivotally mounted on said valve seat,
   a valve disc mounted on said arm at a position to engage said valve seat in a valve closed position,
   a lever pivotally mounted on said valve body adjacent said valve arm, and
   a shock absorber on each of first and second sides of said lever wherein said first side is adjacent said arm.

2. The pressure relief valve set forth in claim 1 further comprising at least one shock absorbing member between said valve disc and said valve arm.

3. The pressure relief valve set forth in claim 1 further comprising resilient means for biasing said valve disc into engagement with said valve seat.

* * * * *